(12) United States Patent
Cesaroni

(10) Patent No.: US 6,180,038 B1
(45) Date of Patent: Jan. 30, 2001

(54) METHOD FOR BONDING OF TUBES OF THERMOPLASTICS POLYMERS

(75) Inventor: Anthony Joseph Cesaroni, Unionville (CA)

(73) Assignee: Joseph Anthony Cesaroni, Unionville (CA)

( * ) Notice: Under 35 U.S.C. 154(b), the term of this patent shall be extended for 0 days.

(21) Appl. No.: 09/186,519

(22) Filed: Nov. 5, 1998

Related U.S. Application Data

(63) Continuation-in-part of application No. 08/791,235, filed on Jan. 30, 1997, now abandoned.
(60) Provisional application No. 60/011,261, filed on Feb. 7, 1996.

(51) Int. Cl.⁷ .................................................... B29C 45/14
(52) U.S. Cl. ........................ 264/135; 264/261; 264/263; 264/265; 264/277
(58) Field of Search .................................. 264/263, 261, 264/262, 297, 134; 165/173, 174, 175, 176

(56) References Cited

U.S. PATENT DOCUMENTS 2,225,856 * 12/1940 Buck ..................................... 257/220
2,969,956 * 1/1961 Forgo .................................... 257/224
4,328,862 * 5/1982 Gossalter .............................. 165/158
4,369,157 * 1/1983 Conner ................................. 264/246
4,643,249 * 2/1987 Grawey ................................ 165/159
5,036,912 * 8/1991 Woosnam ............................. 165/158

FOREIGN PATENT DOCUMENTS

022234 * 1/1981 (EP) .
1379511 * 1/1975 (GB) .

* cited by examiner

Primary Examiner—Jan H. Silbaugh
Assistant Examiner—Edmund H. Lee
(74) Attorney, Agent, or Firm—Richard H. Burgess

(57) ABSTRACT

A method for bonding a tube into a device each of which is formed from a thermoplastic polymer. The device has first and second solid members in spaced apart relationship to form a hollow cavity therebetween. At least one linear channel extends through each of said solid members in an aligned relationship, such that a tube may be passed through in sliding engagement, including through the hollow cavity. Molten polymeric composition is injected into the hollow cavity at a temperature lower than the melting point of the thermoplastic polymer so as to bond to the thermoplastic polymer and to the tube to form fluid-tight bonds therewith.

10 Claims, 2 Drawing Sheets

METHOD FOR BONDING OF TUBES OF THERMOPLASTICS POLYMERS

CROSS REFERENCE TO RELATED APPLICATIONS

This application is a Continuation-in-Part of U.S. Non-Provisional Application 08/791,235 filed Jan. 30, 1997, now abandoned, and also claims priority from U.S. Provisional Application 60/011,261 filed Feb. 7, 1996.

FIELD OF THE INVENTION

The present invention relates to a method of bonding tubes to devices, especially channelled devices, in which the tubes and devices are formed from thermoplastic polymers, so as to provide fluid flow communication through the devices, through the tubes and channels, especially through tubes extending through the devices. In particular, the method relates to the bonding of tubes into devices that are articles forming all or part of headers or manifolds in the manufacture of plastic heat exchangers.

BACKGROUND TO THE INVENTION

Panel heat exchangers formed from thermoplastic polymers and methods for the manufacture of such heat exchangers are known. For instance, a number of heat exchangers formed from thermoplastic polymers and methods for the manufacture thereof are disclosed in PCT Patent Application WO91/02209 of A. J. Cesaroni, published Feb. 21, 1991, and in the published patent applications referred to therein. Thermoplastic polymer heat exchangers of a tubular construction are described in U.S. Pat. Nos. 4,923,004, and 5,078,946, issued May 8, 1990 and Jan. 7, 1992, respectively, both of E. L. Fletcher and T. H. Kho, in which tubes are integrally formed with a manifold section in a moulding or similar process. A preferred material of construction for the heat exchangers is polyamide, especially aliphatic polyamide.

While heat exchangers formed from thermoplastic polymers have been fabricated by the techniques described in the above patents and published patent applications, improvement in the construction and methods of fabrication would be beneficial to add further flexibility and economy to the fabrication and use of heat exchangers formed from thermoplastic polymers. In particular, assembly of tubes into headers or manifolds or other structures in the manufacture of tube heat exchangers is usually a tedious and time-consuming process, often involving use of adhesives to bond the tubes into position.

British Patent 1,379,511—Gibbons et al, published 1975, discloses a method of making a heat exchanger in which a low-melting metal is first poured into a cavity surrounding tubes, preferably incorporating plug portions protruding into the tubes to keep the tubes open; then polypropylene (PP) is cast on the ends to form headers encapsulating the tubes. Finally the low-melting metal is melted out, leaving the PP exposed to the inside of the heat exchanger.

U.S. Pat. No. 2,225,856—Buck (1940) discloses a heat exchanger with aluminum tubes sealed through an apertured sheet or plate of resilient rubber between pairs of spaced header plates. There is no suggestion to cast a polymer instead of using a preformed apertured sheet of rubber.

U.S. Pat. No. 4,323,115—Stafford et al (1982) discloses a tube heat exchanger with tube sheets comprising first a layer of insulation such as fiberglass reinforced polymethyl methacrylate, then with preferably a liquid resin poured in around the tubes on top of the insulation. Preferably catalysed epoxy resin are used which set at ambient temperatures. A key goal is to use a resin that can be burned out without damaging the tubes which can be made of plastic. Instead of the insulation material, a temporary wooden form can be used to hold in place the liquid resin until it solidifies. As an option, the epoxy can be in two layers with fibers in one for insulation and particles in the other for reinforced strength. In any event, there is no suggestion of injecting a thermo plastic filler between two solid plates to form a header, with tubes threaded through holes in the two solid plates.

SUMMARY OF THE INVENTION

A method for the bonding of thermoplastic polymer tubes into thermoplastic polymer devices in a fluid tight manner has now been found.

Accordingly, an aspect of the present invention provides a method for bonding a tube into a device each of which is formed from a thermoplastic polymer, said device having a first solid member and a second solid member in spaced apart relationship to form a hollow cavity therebetween, said device having at least one channel extending through each of said solid members in an aligned relationship, the channel through at least one of said solid members being linear and being of a shape and size to accommodate a tube in sliding engagement such that the tube may be passed through said member, through the hollow cavity and into the channel of the other solid member to provide fluid flow communication through the device; comprising the steps of:

inserting said tube into the linear channel, such that it extends through the hollow cavity and into the channel of the other solid member;

injecting molten polymeric composition into the hollow cavity, said molten composition having a temperature lower than the melting point of said thermoplastic polymer, said composition being selected and being used in an amount so as to bond to the thermoplastic polymer and to the tube to form fluid-tight bonds therewith.

In a preferred embodiment of the method of the present invention, there are a plurality of channels through each solid member in an aligned relationship.

In another embodiment, the polymeric composition is injected in an amount so as to fill said hollow cavity.

In a further embodiment, the tube and device are formed from a polyamide, and preferably said composition is also a polyamide.

In yet another embodiment, the channels through both solid members are linear, and the tube extends through both solid members.

In a still further embodiment, the tube is coated with an adhesive to promote adhesion to said polymeric composition and/or said tube is a co-extruded tube with the outer layer to promote bonding of said tube to said polymeric composition.

In a further embodiment, the device is formed in two parts that mate together to provide said hollow cavity, especially where the composition also bonds the two parts of the device together.

In another embodiment, the cavity of the device comprises 10–50% by volume of the device.

In a further embodiment the device is part of a header or manifold for a plastic heat exchanger.

BRIEF DESCRIPTION OF THE DRAWINGS

The method of the present invention will be particularly described with reference to the embodiment shown in the drawings, in which.

DETAILED DESCRIPTION OF THE INVENTION

Figure 1:
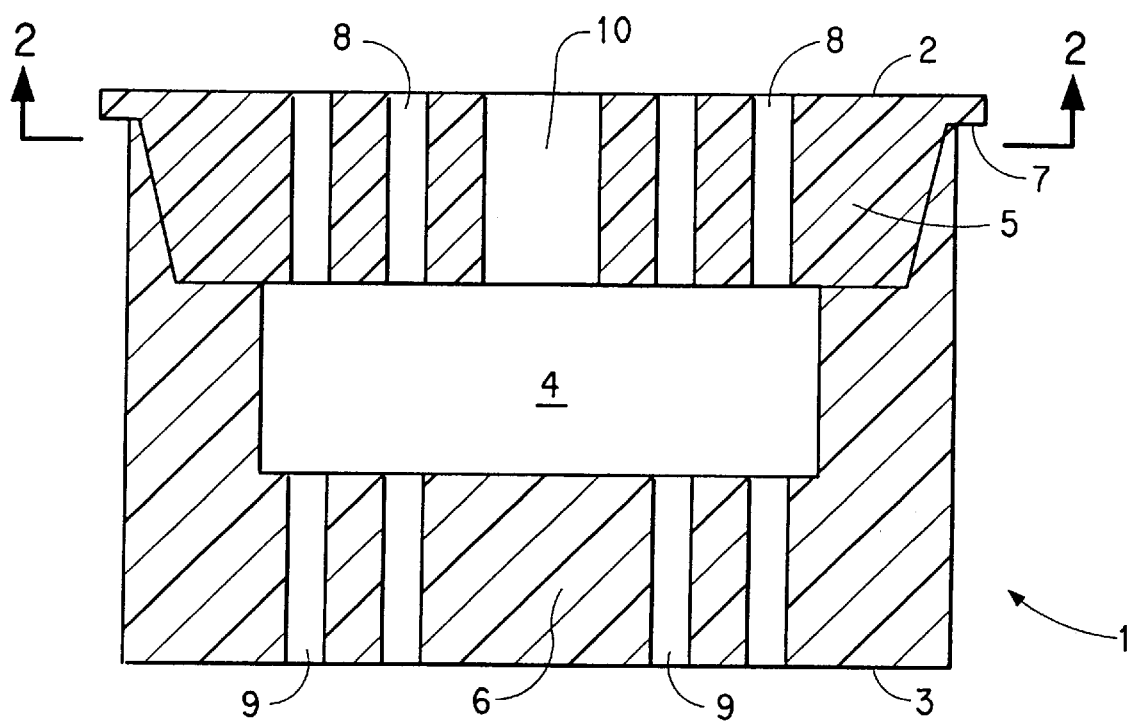
FIG. 1 is a cross-section of an device of the present invention.

Referring to FIG. 1, device 1 has a first surface 2 and a second surface 3, first surface 2 being the upper surface of the device as shown in the embodiment of FIG. 1 and second surface 3 being the lower surface of the embodiment shown in FIG. 1. Device 1 also has a hollow cavity 4, which is located between upper member 5 and lower member 6. Upper member 5 and lower member 6 are two pieces that mate together to form device 1 shown in FIG. 1. Upper member 5 is shown as having a plurality of channels 8 passing from first surface 2 to hollow cavity 4. Lower member 6 has channels 9 that correspond and are aligned with channels 8 of upper member 5. Channels 8 and 9 would normally be of the same dimensions, and intended for insertion of one continuous tube through both channels 8 and 9. Upper member 5 also has passageway 10 passing from first surface 2 to hollow cavity 4. As shown in FIG. 1, passageway 10 would normally be of greater dimensions than channels 8 and 9. Passageway 10 is intended for injection of a polymeric composition into hollow cavity 4. Upper member 5 is shown as having a lip 7 around the upper periphery thereof.

As shown in FIG. 1, it is preferred that device 1 be formed of two parts viz. upper member 5 and lower member 6. Upper member 5 and lower member 6 should be in a mating relationship. Alternatively, upper member 5 and lower member 6 could be separate members that are held in a spaced apart relationship during the manufacturing process, with the mould of injection moulding apparatus forming sides therebetween during the injection of the polymeric composition. In such cases, passageway 10 could be eliminated. Passageway 10 could be located elsewhere e.g. to the side and not through upper member 5.

Figure 2:
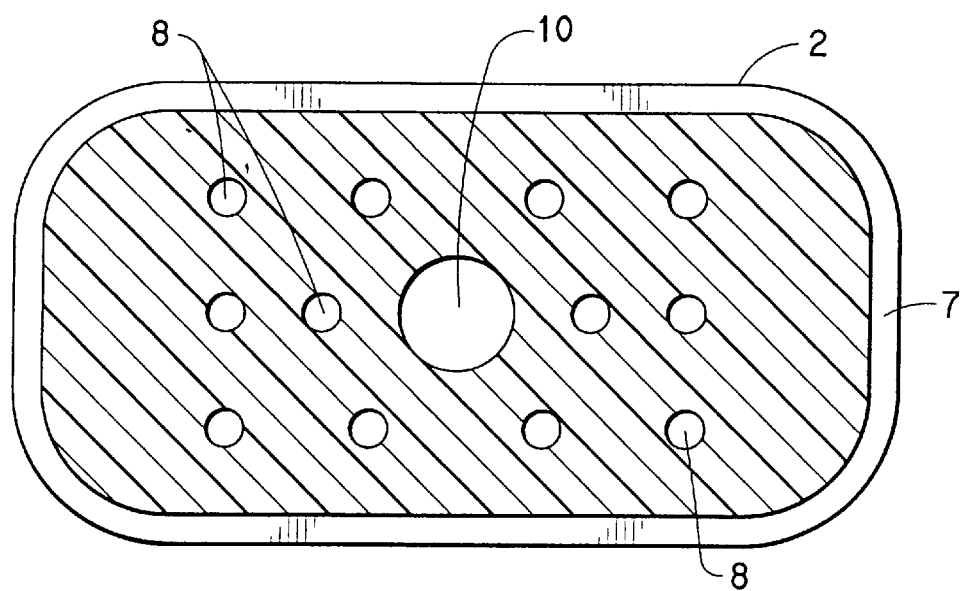
FIG. 2 is a cross-section of the device of FIG. 1 through A—A.

FIG. 2 shows first surface 2 of upper member 5 with a centrally located passageway 10. In addition, first surface 2 is shown as having a plurality of channels 8.

Figure 3:
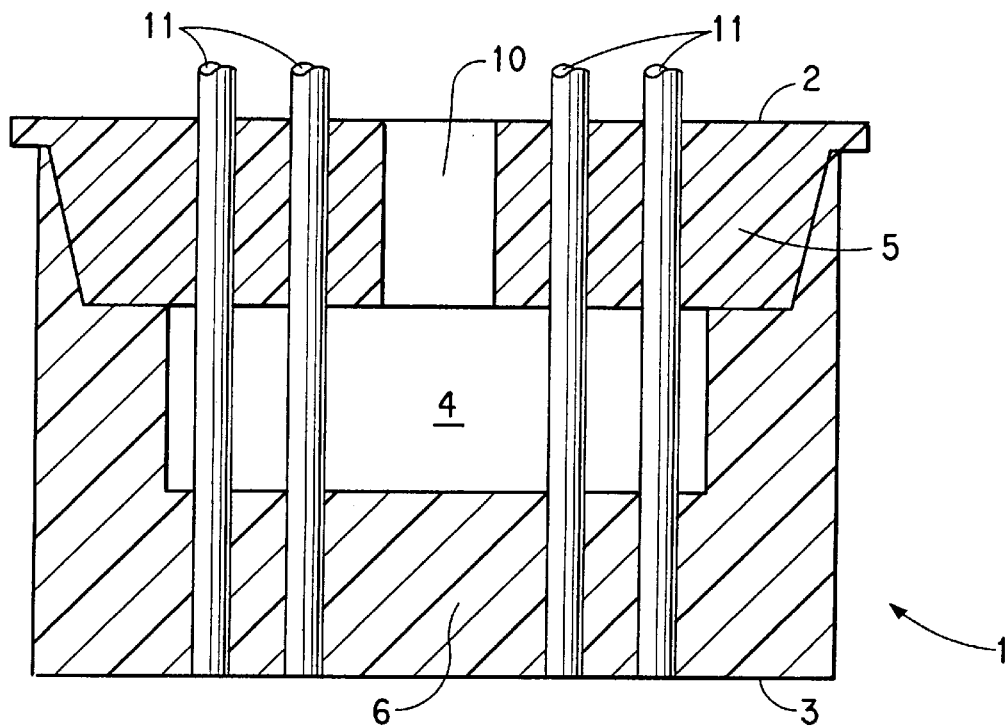
FIG. 3 is a cross-section of the device of the present invention with tubes in place.

FIG. 3 shows device 1 of FIG. 1 with tubes 11 in place. Tubes 11 are shown as passing from second surface 3 through hollow cavity 4, through upper member 5 and extending beyond upper surface 2. It will be understood, however, that tubes 11 could extend beyond both first surface 2 and second surface 3, or extend beyond neither of first surface 2 or second surface 3.

Figure 4:
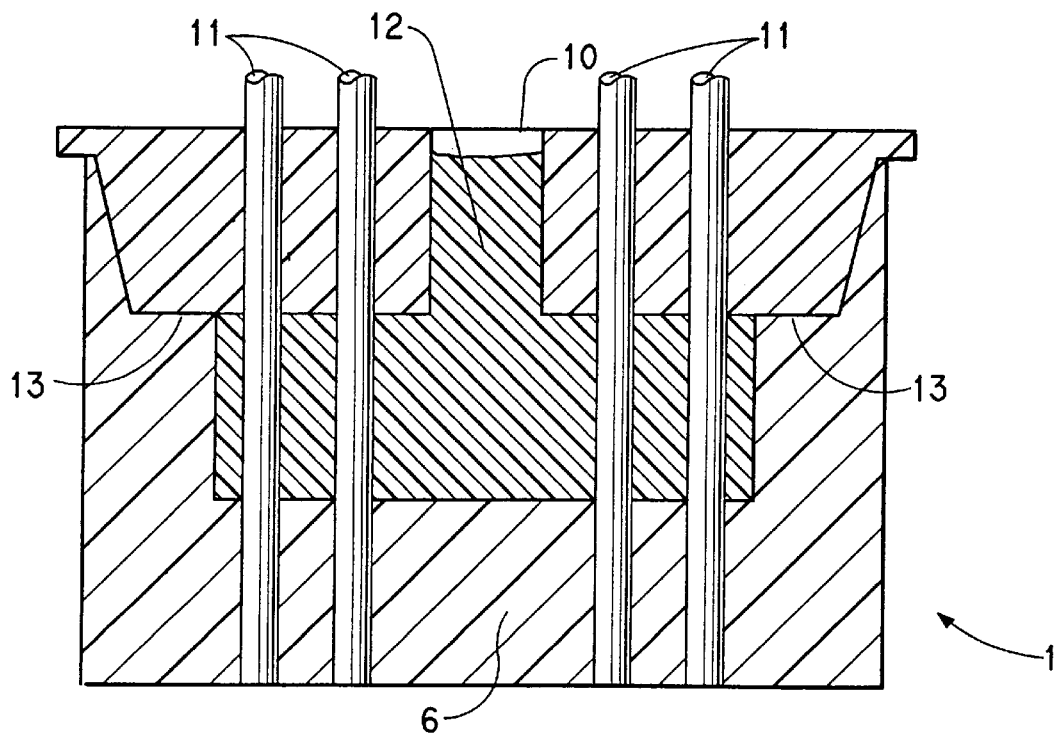
FIG. 4 is a cross-section of an device of the invention showing the presence of the polymeric composition.

FIG. 4 shows device 1 after the injection of the polymeric composition. Hollow cavity 4 and most of passageway 10 have been filled with polymeric composition 12. Polymeric composition 12 is selected so that a bond will be formed between the polymeric composition and the material of construction of tubes 11, upper member 5 and lower member 6. Polymeric composition serves to bond together upper member 5 and lower member 6, and to embed tubes 11 in place. In addition, polymeric composition 12 forms a fluid tight seal between upper member 5 and lower member 6 and between tubes 11 and each of upper member 5 and lower member 6. In practical terms, it will likely be found that polymeric composition 12 has penetrated into junction area 13 between upper member 5 and lower member 6. Such penetration of junction area 13 by polymeric composition 12 serves to bond together upper member 5 and lower member 6 and in addition to further form a fluid tight seal.

In operation, device 1 in the form shown in FIG. 3 is constructed. This may be done by bringing upper member 5 into position and locking with lower member 6. Tubes 11 would then be inserted into channels 8 and 9 in the manner desired. Alternatively, tubes could be inserted through one of upper member 5 and lower member 6, and then upper member 5 and lower member 6 could be brought into contact. In either technique, pins or rods (not shown) could be inserted through channels 8 and 9 to aid in the positioning and insertion of tubes 11. The assembled device 1 is then brought into contact with apparatus for injection of polymeric composition 12. Polymeric composition 12 is injected through passageway 10 into hollow cavity 4 especially in an amount that will fill hollow cavity 4 and most of passageway 10. An excess amount of polymeric composition 12 may be used, but this may not be economic; in other respects it is likely not particularly disadvantageous to use an excess of polymeric composition 12.

In an embodiment, the surface of hollow cavity 4 and/or the outer surface of tubes 11 are coated with an adhesive, to promote bonding of the tubing to the device. Examples of a suitable adhesive, especially when the polymeric composition used is a polyamide composition, are given in European patent application No. 287 271 of A. J. Cesaroni, published Oct. 19, 1988.

In another embodiment, tubes 11 are co-extruded tubes, with the exterior layer of the tubes promoting bonding to the polymeric composition injected into the hollow cavity 4. The polymer of the outer layer of the tube may be the same as the polymer of the polymeric composition or a polymer bondable thereto under the moulding conditions.

In preferred embodiments, the tubes and device may be formed from a variety of polyamide compositions. The composition selected will depend primarily on the end use e.g. the end use intended for a heat exchanger fabricated using an device having tube that has been manufactured using the method described herein, especially the temperature of use and the environment of use of such a heat exchanger, including the fluid that will be passed through the heat exchanger and the fluid e.g. air, external to the heat exchanger. In the case of use of such a heat exchanger on a vehicle, the fluid may be air that at times contains salt or other corrosive or abrasive matter, or the fluid may be liquid e.g. radiator fluid.

A preferred polymer of construction is polyamide. Examples of polyamides are the polyamides formed by the condensation polymerization of an aliphatic dicarboxylic acid having 6–12 carbon atoms with an aliphatic primary diamine having 6–12 carbon atoms. Alternatively, the polyamide may be formed by condensation polymerization of an aliphatic lactam or alpha, omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid, amino undecanoic acid and amino dodecanoic acid. Preferred examples of the polyamides are polyhexamethylene adipamide and polycaprolactam, which are also known as nylon 66 and nylon 6, respectively.

While particular reference has been made herein to the use of polyamides as the polymer used in the fabrication thereof, it is to be understood that other polymers may be used. A principal consideration in the selection of the polymers of the device and the tubing is that the polymers need to be thermoplastic polymers, and preferably polymers that are compatible in the molten form. In addition, the environment of use of devices fabricated using the method of the invention, for example a heat exchanger and the properties of the fluid passing through and over such a heat exchanger, the temperature and pressure of use and the like, are important. Examples of other thermoplastic polymers that may be used are polyethylene, polypropylene, fluorocarbon polymers, polyesters, elastomers e.g. polyetherester elastomers, neoprene, chlorosulphonated polyethylene, and ethylene/propylene/diene (EPDM) elastomers, polyvinyl chloride and polyurethane.

The polymeric composition injected into the cavity, to surround and bond the tubes, needs to have a melt temperature that is less than the melting point of the polymer used to form the tubes and devices. It is to be understood, however, that cooling could be applied to the tubes and articles during the moulding process.

A variety of polymer compositions may be injected into the cavity. The composition needs to be a composition that will bond to the tubes and devices under the conditions of injection of the composition into the cavity. It is to be understood, however, that the tubes and/or devices could be coated to promote adhesion or be coextruded tubes, or the like, as discussed herein, to promote such adhesion. For example, the composition may be based on a polyamide, especially if the tubes and devices are formed from the polyamide. Alternatively, the composition for the cavity could be an epoxy resin, a modified polyamide composition e.g. blends of polyamides and other polymers, a modified polyolefin composition e.g. grafted polyolefin such as grafted polypropylene, grafted polyethylene, grafted olefin copolymers or the like.

In preferred embodiments of the present invention, the tubing used in the fabrication of the panel heat exchanger has a thickness of less than 0.7 mm, and especially in the range of 0.07–0.50 mm, particularly 0.12–0.30 mm. The thickness of the tubing will, however, depend to a significant extent on the proposed end use and especially the properties required for that end use.

The polymer compositions used in the fabrication of the heat exchangers may contain stabilizers, pigments, fillers, including glass fibres, and the like, as will be appreciated by those skilled in the art.

The polymer composition of the tubing and of the device may be the same or different, depending on the intended use of the fabricated devices. All seals should be fluid tight seals, especially in a heat exchanger, to prevent leakage of fluid from the heat exchanger.

The method of the present invention provides a versatile and relatively simple method of fabricating tubes into devices. Such devices, either before or subsequent to the bonding of tubes, could be part of other articles, especially headers or manifolds for heat exchangers. Heat exchangers may be used in a variety of end-uses, depending on the polymer(s) from which the heat exchanger has been fabricated and the intended environment of use of the heat exchanger. In embodiments, the panel heat exchangers may be used in automotive end uses e.g. as part of the water and oil cooling systems. The panel heat exchangers may also be used in less demanding end uses e.g. in refrigeration and in comfort heat exchangers.

The present invention is illustrated by the following examples:

EXAMPLE 1

Tubes made from nylon 66 were bonded to a device also made from nylon 66 using the procedure of the present invention. The polymeric composition injected into the cavity was an epoxy resin. The tubes had been primed with an adhesive of a type as described in the aforementioned European Patent Application 287271 of A. J. Cesaroni. The epoxy resin composition was a 50:50 mixture of Aralditetm AV 8113 and Hardner HV 8113 from Ciba-Geigy.

The epoxy resin composition was injected into the cavity and allowed to cure at room temperature for a few hours, in order to permit bonds to develop.

The bond strength obtained was tested using an Instron tensile testing apparatus using a horizontal flat rigid metal plate with C-clamps. Individual tubes were placed between the doors of the Instron apparatus, and stretched in the direction of the axis of the tubes. The force required to cause failure and the type of failure obtained were noted. Measurements were averaged over 1015 pulls.

It was found that all failures resulted from breakage of the tubes. Many tubes failed near the bonded end or slightly inside the channel passing through the device, with no failures occurring as a result of debonding of the tubes from the moulded apparatus. The average force to break the tubes was 29.1 pounds.

Samples were immersed in a mixture of glycol and water at 100° C. for 24 hours, and testing was repeated. The type of failure was similar, with the average force to break the tubes being 22.8 pounds. Samples that have been treated in the glycol water mixture were dried in air at 70° C. for 8 hours and then tested. The type of failure was the same, with the average force to break being 31.8 pounds.

Samples of the glycol-water treated samples that have been dried in air at 70° C. were further aids at 121° C. for seven days. The type of failure was again the same, with the average force to break being 43.4 pounds.

What is claimed is:

1. A method for bonding a plurality of tubes into a device as part of a header or manifold for a plastic heat exchanger, each of which tubes and header or manifold is formed from a thermoplastic polymer, said device having a first solid member and a second solid member in spaced apart relationship to form a hollow cavity therebetween, said device having a plurality of tubular channels extending through each of said solid members in an aligned relationship, the channels, through at least one of said solid members being linear and being of a shape and size to accommodate in sliding engagement one tube for each channel in each header such that the tubes may be passed through said member, through the hollow cavity and into the channels of the other solid member to provide fluid flow communication through the device; comprising the steps of:

inserting said tubes into the linear channels, such that they extend through the hollow cavity and into the channels of the other solid member;

injecting molten polymeric composition into the hollow cavity, said molten composition having a temperature lower than the melting point of said thermoplastic polymer, said composition being selected and being used in an amount so as to bond to the thermoplastic polymer and to the tubes to form fluid-tight bonds therewith.

2. The method of claim 1 in which the polymeric composition is injected in an amount so as to fill said hollow cavity.

3. The method of claim 1 in which the tubes and device are formed from a polyamide.

4. The method of claim 1 in which said composition is also a polyamide.

5. The method of claim 3 in which the channels through both solid members are linear, and the tubes extend through both solid members.

6. The method of claim 3 in which the tubes are coated with an adhesive to promote adhesion to said polymeric composition.

7. The method of claim 3 in which said tubes are a co-extruded tube with the outer layer to promote bonding of said tubes to said polymeric composition.

8. The method of claim 3 in which the device is formed in two parts that mate together to provide said hollow cavity.

9. The method of claim 3 in which the polymeric composition bonds the solid members together.

10. The method of claim 3 in which the cavity of the device comprises 10–50% by volume of the device.

* * * * *